Sept. 22, 1959  A. AVENI  2,905,073
COLLAPSIBLE HOOD
Filed Feb. 9, 1956  2 Sheets-Sheet 1

INVENTOR.
ANTHONY AVENI,
BY
Norman L. Chalfin
AGENT.

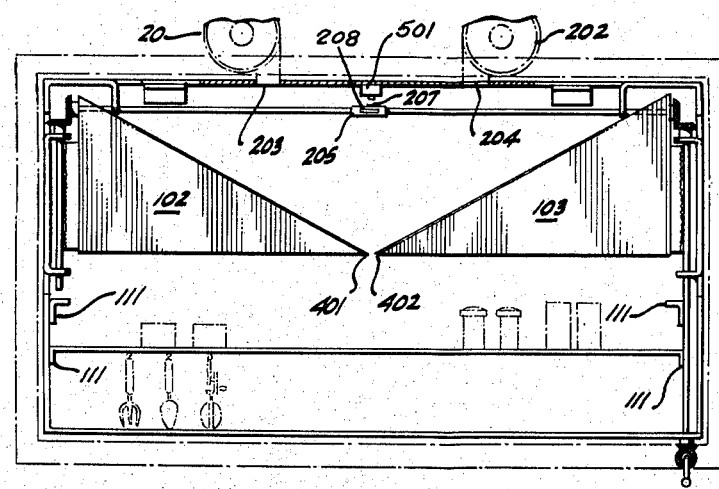
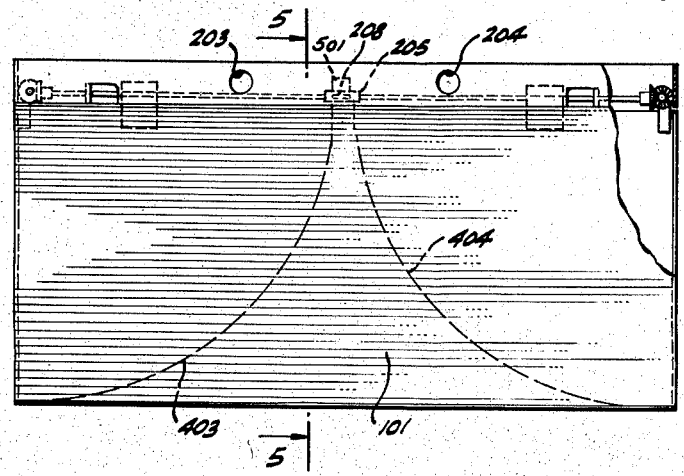
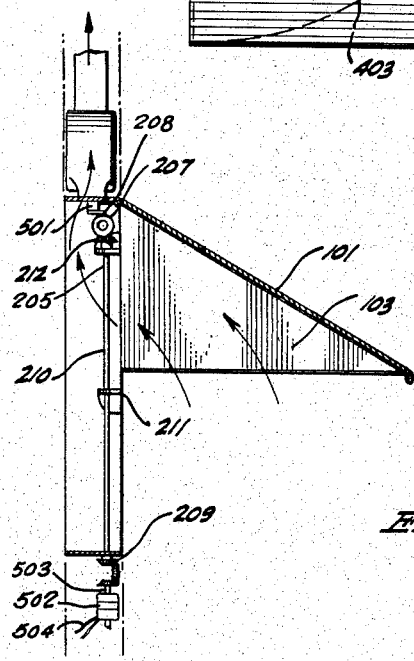
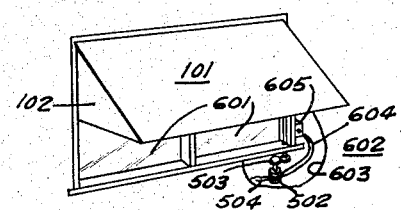

United States Patent Office 2,905,073
Patented Sept. 22, 1959

2,905,073
COLLAPSIBLE HOOD
Anthony Aveni, Los Angeles, Calif.
Application February 9, 1956, Serial No. 564,448
4 Claims. (Cl. 98—115)

This invention relates to collapsible hoods and more particularly to a novel collapsible and vented hood for kitchen stoves and other applications.

When cooking over kitchen stoves the smoke, gases, and cooking odors if not otherwise dissipated can cause considerable dirt and discomfort in the home. In some homes a vent but no hood is provided to draw off these disturbing fumes and odors. In others a permanently affixed hood is used over the stove which may or may not be vented. Either the vent or vented hood may include motor driven exhaust fans. The permanently affixed hood may be the proper thing for commercial kitchens but in the home the appearance of an immovable hood is certainly less than attractive.

This invention contemplates collapsible hoods which may be used for kitchen stoves and may also be applied to window shade devices which may be collapsed either manually or by mechanisms which are actuated when a windstorm or inclement weather begins.

I have devised a hood for home kitchen stoves that has all of the desirable features of the hoods mentioned above but which when the kitchen is not in use may be closed so as to provide a flush and therefore neater appearance with the wall. Additionally, the hood of my invention incorporates novel mechanical features which add to its utility and ease of operation to open and close the hood. When the hood is opened for use exhaust fans are set in operation to draw off the cooking fumes and odors. Additionally shelves are provided in the hood of my invention for cooking needs.

Accordingly, it is an object of my invention to provide a collapsible vented hood for kitchen stoves with simple means for opening and collapsing the hood.

It is a further object of my invention to provide a collapsible vented hood for kitchen stoves which when closed presents a flush-with-the-wall appearance and when open automatically engages electrically operated exhaust fan equipment to draw off noxious fumes and odors.

It is still another object of my invention to provide a collapsible hood assembly for kitchen stoves which may be set into a kitchen wall over a stove and is provided with exhaust means for fumes and odors and shelf space for kitchen utensils, cooking accessories and other necessary items.

And still another object of my invention is to provide a collapsible hood assembly for windows which in the open position thereof provide an awning for protection against the bright sunlight and which may be collapsed either manually or in response to a sensing means which is actuated by wind or rain to operate its motive equipment, thereby providing automatic storm window protection.

It is yet another object of my invention to provide a collapsible kitchen stove hood with a simple manual or motor driven cranking arrangement to collapse and open the hood.

These and other objects of my invention will be more fully understood from the specification which follows and the appended claims taken together with the accompanying drawings in which an embodiment of my invention is shown.

In the figures:

Fig. 3 is a view of the hood assembly of my invention with the canopy removed to show certain mechanical details thereof;

Fig. 4 is a top view of the hood assembly shown open and partially cutaway to illustrate mechanical features thereof;

Fig. 5 is a section through the center of the invention as shown in Fig. 4, incorporating a further embodiment thereof, and Fig. 6 illustrates another embodiment of the invention applied to an awning.

Figure 1:
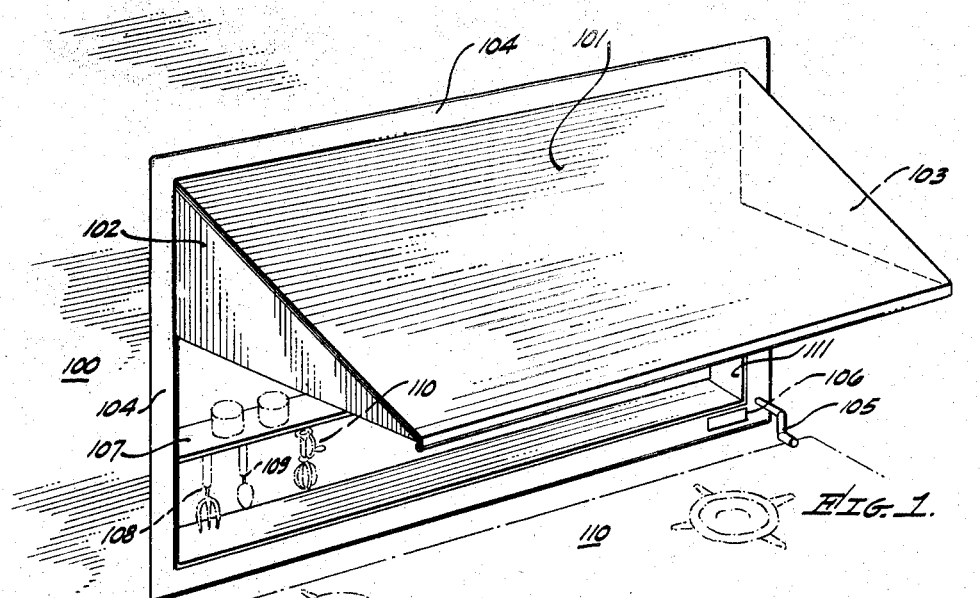
Fig. 1 is an overall perspective view of the collapsible hood of my invention shown in the open condition as when in use.

Referring now to Fig. 1 the hood of my invention is shown as it might appear in use when set in a kitchen wall 100 over a kitchen stove 110. The hood comprises a canopy 101 supported by hinges, 220 and articulating sides 102 and 103. An outer frame assembly 104 is provided to house the canopy supporting hinges and operating mechanism of the sides and other apparatus to be described below. Canopy 101 when open is supported by sides 102 and 103. A crank 105 shown protruding from the frame 104 at lower right is provided to operate the hood mechanism to be described below for raising and lowering the canopy 101. The crank 105 may be of any convenient type and may be made collapsible so as to be flush with the wall when the hood is in collapsed condition. When the crank 105 is so collapsed it may be made to fit within a recess in the frame 104 that may be provided as shown at 106. A shelf 107 is provided for supporting spice cans, cooking utensils and the like. More than one shelf such as 107 may be provided as suits the needs of the housewife or for other utilitarian purposes. The lower portions of the shelves such as 107 may include hooks from which to suspend utensils such as 108, 109, 110. The inner side walls as at 111 of the frames 104 may be equipped with shelf hanger receptacles to accommodate the shelves such as 107 so that the shelves may be placed at different levels as desired.

Figure 2:
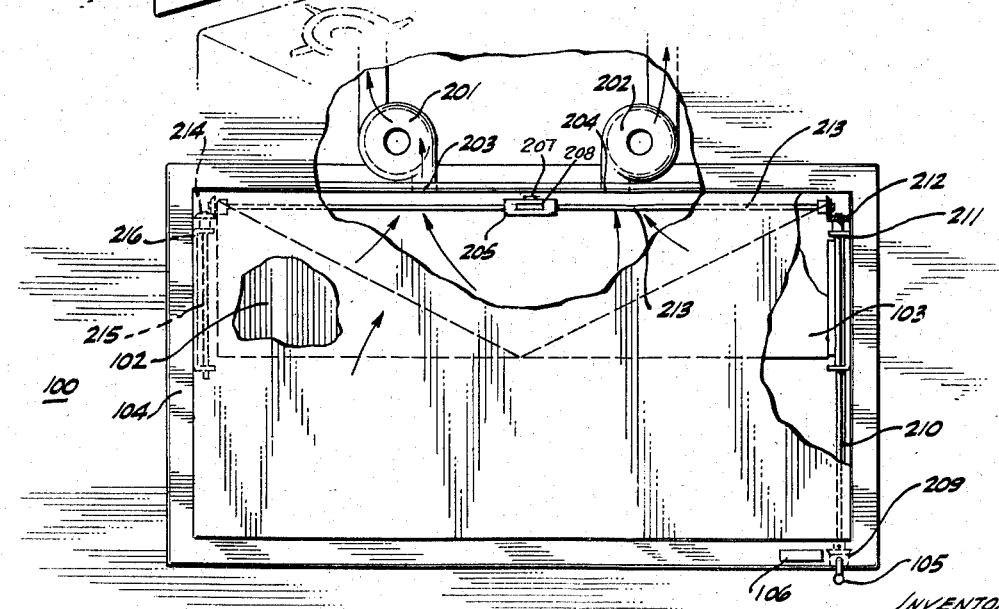
Fig. 2 is a view of the hood of my invention when closed partially cut-away to show the mechanical details of its operation.

In Fig. 2 a view of the hood of my invention is shown when looking straight at it in its collapsed position from the front. Portions of Fig. 2 are shown in cut away form to expose the apparatus for operating the hood and the blowers 201 and 202. Blowers 201 and 202 are arranged within the frame 104 of the hood assembly so as to exhaust by suction smoke and fumes which come into the canopy area. The blowers may be electrically operated and may be of any type commercially available for such purposes.

The operating mechanism for raising and lowering the canopy portion 101 of the hood assembly of my invention includes the crank 105 which is operatively connected at a right angle to a shaft 210 through a bevel gear assembly 209 shown in more detail in Fig. 5. Shaft 210 is supported by a bearing assembly 211 which is illustrated in the cutaway portion at the upper right of Fig. 2. Bearing assembly 211 supports right hand canopy support side 103. A bevel gear assembly 212 is provided to effect a right angle driving connection with shaft 210 and a shaft 213. At the opposite end of shaft 213 another beveled gear assembly 214 provides a right angle operative coupling with another shaft 215 supported in another bearing assembly 216. Bearing assembly 216 supports left hand canopy support side 102.

When crank 105 is rotated to operate beveled gear assembly 209 shaft 210 is rotated thereby and operates beveled gear assembly 212 which results in rotation of shaft 213. Shaft 213, in turn, rotates beveled gear assembly 214 one gear of which is attached to shaft 213 and the other drives shaft 215. Approximately at the center of shaft 213 a switch operating assembly is provided. This assembly comprises a stop bar 208 welded to a hub 205 which may be fixed to shaft 213 by a set screw 207. Stop bar 208 is designed to start up the blowers by actuating a switch 501 as further described below in connection with Fig. 5.

Attached to support bracket 211 is articulating side 103. Attached to support bracket 216 is articulating side 102. These sides 102 and 103 articulate respectively on shafts 215 and 210 to which the brackets 216 and 211, respectively, are fixedly attached. The attachment may be accomplished by one of many methods such as brazing or by knurling the shafts 215 and 210 at the points of attachment of the brackets and force fitting the brackets on the shafts. Thus, as crank 105 is rotated and shafts 210 and 215 turn, as previously described, sides 102 and 103 move outward or inward according to the direction of rotation of crank 105. In place of crank 105 an electric motor drive 502, as illustrated at the lower left of Fig. 5, may be coupled by a gear 503 to gears 209 and so to shaft 210 for rotating the shaft. Limit, and polarity, or field reversing switches of conventional design may be attached to shafts 210 or 215 and electrically connected to motor 502 (Fig. 5) through its leads 504 to stop the motor at full open position of the canopy once started for opening the canopy—or at fully closed position, when started for closing the canopy. For a motor driven canopy a push button or other switch may be provided in place of crank 105. The push button is electrically connected with motor 502, with its leads 504.

Referring now to Figs. 3 and 4 which show the canopy of this invention in collapsed position with canopy off (Fig. 3) and on (Fig. 4) it may be seen that in the collapsed position articulating sides 102 and 103 are folded in. As they move out upon operation of crank 105 or as rotated by the motor 502 and its electrical system described just above, the tips 401 and 402 of the articulating sides 102 and 103, respectively, describe paths 403 and 404 shown in Fig. 4. The sides 102 and 103 lift the canopy 101 up by virtue of the pressure against the canopy 101 as the sides 102 and 103 are rotated outwardly so that the canopy assumes the position shown in profile in Fig. 5, resting on sides 102 and 103 as seen in perspective in Fig. 1.

As may be clearly seen in the cross sectional view of Fig. 5, when hub 205 rotates with shaft 213 while canopy 101 is raised to the full open position stop bar 208 attached to hub 205 makes contact with switch 501 electrically connected with the motors of blowers 201 and 202, switch 501 may be a leaf actuated pressure switch. This results in application of electric current to blower motors in blowers 201 and 202 to set them in operation to exhaust fumes that may arise from the stove. Manually operated cut out switches may be incorporated in the canopy mechanism, the stove or frame 104 to permit the blower motors to be shut off if not desired at any time. The blowers may be made operative only if the stove is operative. This may be accomplished by mechanically interconnecting an electric switch to each gas or electric burner on-off control in a gas or electric stove. The electric switch coupled to the stove burner control is electrically connected in series with switch 501 so that both must be closed to operate the blower. As any burner is turned on the switch connected to it is actuated to energize the blower motors through switch 501 when canopy is open and stop-bar 208 makes contact with switch 501. The blowers may be termed by some, "exhaust fans."

However named their function is the same. In Fig. 6 there is shown generally the appearance of a window 601 which may be of the single or multiple type, with a canopy 101 of this invention as previously described with its sides (of which 102 is visible) supporting canopy 101. In a broken away portion 603 of the wall 602 there may be seen a motor 502 with power leads 504 which may be connected to a source of power and control leads 604 connected between motor 502 and a control device 605. Control device 605 may be an electronic instrument of which many are known which operate a relay in the presence of an increase in wind pressure or an increase in moisture in the atmosphere. Such devices are well known to be adjustable for the degree of response desired. Such devices have not been previously known to actuate a shutter or awning operating mechanism 502, 503, 504 such as described herein above. It is obvious that the same arrangement may also be applied to a door.

There has been described above a novel collapsible canopy or awning for kitchen stoves and an awning for windows or doors which is provided with either manual or automatic actuating means for collapsing or opening the canopy or awning and also with fume-exhausting suction fans or blowers that are set in operation automatically when the canopy or awning is opened, or may be manually controlled. I have shown my invention in a representative form which is illustrative of one of the many ways in which the canopy may be implemented without departing from the spirit of my invention within the scope of the claims which follow:

What is claimed as new is:

1. A collapsible kitchen stove hood assembly comprising: a rectangular frame for insertion in a wall, said frame having shaft supports in its vertical sides adapted for a horizontal shaft near the top and vertical shafts in the sides of said frame; a gear, shaft, and crank assembly mounted in said shaft supports in said frame and including a vertical pair of shafts and a horizontal shaft coupled together with the gears for rotation of said vertical shafts in opposite directions; a canopy hingedly attached to the top of said frame and articulating thereon; and a pair of vertical side supports fixedly mounted on said vertical shafts and rotatable outwardly on said shafts to raise said canopy as said gear, shaft and crank assembly is operated.

2. A collapsible hood assembly comprising a rectangular frame adapted for insertion in a wall, said frame having supports therein for vertical and horizontal shafts; a canopy hingedly attached to the top of said frame for articulation thereon; geared driving shaft assembly, including a horizontal member, and a pair of vertical members mounted in said supports in said frame and coupled together at opposite ends of said horizontal member, said horizontal member being at the top of said frame; articulating side members fixedly attached to said vertical members and rotatable therewith, said articulating side members being normally positioned beneath said canopy; and a driving mechanism coupled to the bottom end of one of said vertical members, and attached to said frame, whereby when said driving shaft assembly is actuated by said driving mechanism to rotate said vertical members in opposite direction said articulating side members push the unattached edge of said canopy outward from said frame until said side members support said canopy forming a hood, and when said vertical members are rotated inwardly said side members are turned inward toward said frame beneath said canopy, and said canopy falls by gravity against said side members into said frame forming a flush-to-the-wall surface in said frame when closed.

3. A collapsible awning comprising: a rectangular canopy; a rectangular frame; said canopy being hingedly attached to the top of said frame for articulation thereon; a driving mechanism including a horizontal rod geared at each end and mounted in the top of said frame, and a pair of vertical rods mounted in the sides of said frame, each of said vertical rods having gears at one end thereof which are rotatably coupled to said gears of said horizontal rod; and triangular articulating sides attached to and rotatable with said vertical rods in the sides of said frame under said canopy, whereby when said driving mechanism is actuated said triangular articulating sides are rotated outwardly to lift said canopy upward and outward pivoting on its hingedly attached edge until said sides are supporting said canopy in the form of an awning.

4. A collapsible kitchen stove hood assembly comprising: a supporting frame adapted for placement in a kitchen wall behind a stove; a canopy, hingedly attached to the top of said frame, said frame having mounting brackets adapted to provide bearing supports for driving rods; a set of geared driving rods rotatably inserted in said bearing supports, said rods including a horizontal member and a pair of vertical members coupled to said horizontal members by their respective gears, one of said vertical members being normal to and in driving relation to said horizontal member, said horizontal member being normal to and in driving relation to the other vertical member, rotation of said one vertical member resulting in rotation of said other vertical member in the opposite direction; a pair of articulating side members attached respectively to each, respectively of said vertical members and being rotatable with said vertical members beneath said canopy to raise and lower said canopy over said stove; driving means coupled to one of said vertical members for rotating said articulating side members to raise said canopy; electrically operated fume exhausting means attached within said frame behind said canopy; and switch means, electrically connected to said exhausting means and mechanically operable by a cam hub on said horizontal member positioned in an operating relation to said switch means, said switch means being normally off when said canopy is down and flush with the wall against said frame, said switch being actuated by said cam hub when said canopy is raised, due to the rotation of said horizontal member, whereby said exhaust means is actuated.

References Cited in the file of this patent
UNITED STATES PATENTS

| | | |
|---|---|---|
| 252,093 | Fox et al. | Jan. 10, 1882 |
| 300,962 | Fox | June 24, 1884 |
| 1,577,699 | Edgerton | Mar. 23, 1926 |
| 2,092,509 | Hampton et al. | Sept. 7, 1937 |
| 2,182,106 | Ames | Dec. 5, 1939 |
| 2,582,373 | Cordrey | Jan. 15, 1952 |
| 2,748,687 | Ballard | June 5, 1956 |
| 2,789,263 | Cohn | Apr. 16, 1957 |